United States Patent Office 2,979,549
Patented Apr. 11, 1961

2,979,549

PROCESS AND CATALYST FOR POLYMERIZATION

Telfer L. Thomas, Sarnia, Ontario, Canada, assignor to Esso Research and Engineering Company, a corporation of Delaware No Drawing. Filed Dec. 29, 1958, Ser. No. 783,098

6 Claims. (Cl. 260—683.15)

This invention relates to improved processes and catalysts for the polymerization of unsaturated carbon compounds.

In particular it relates to the liquid phase polymerization of $C_5$ to $C_{15}$ olefinic hydrocarbons.

More particularly, it relates to a process for producing good yields of high quality polymer containing 10 to 30 carbon atoms per molecule by contacting $C_5$ to $C_{15}$ olefins with a catalyst containing sulfuric acid of about 80 to 120%, preferably 85 to 100% concentration, and phosphoric acid of about 100 to 150% concentration.

In one embodiment, it relates to the further polymerization of lower boiling olefinic polymers, e.g. dimers and trimers of $C_2$ to $C_4$ olefin monomers to $C_{12}$ and $C_{12}+$ olefins boiling above about 390° F.

The large use of synthetic detergents has increased the demand for large quantities of $C_{13}$ to $C_{16}$ polyolefins boiling in the 390° to 800° F. range for making detergent alkylate. In the past, dodecylene or tetrapropylene has been an accepted raw material for alkylation with benzene and ultimate conversion to alkyl aryl sulfonate detergents. More recently, the industry has turned to somewhat higher molecular weight olefins, since detergents produced from these olefins possess better foaming characteristics and can be built up in detergent production to give heavy duty performance at less cost. Only a small amount, i.e. about 5% of the yield from a typical tetrapropylene process falls within the $C_{13}$ to $C_{16}$ fractions. Attempts to increase this yield by tetrapropylene recycle have met with little success since the increase in $C_{13}$ to $C_{16}$ production is too small to make this process economical. The term "a typical tetrapropylene process" is used herein to refer to the well known UOP type polymerization process wherein propylene and propylene-butylene feedstocks are polymerized to $C_6$ to $C_{15}$ olefins by passage over a catalyst of phosphoric acid on kieselguhr at pressures from 200 to 2000 p.s.i. and temperatures above 280° F.

Higher molecular weight olefins, $C_{16}$ to $C_{30}$, are of value for use in the production of oil-soluble sulfonates and plasticizers, and olefins of both the lower and higher molecular weight are useful as chemical intermediates.

It has now been discovered that a high single run conversion with a high selectivity to $C_{13}$ through $C_{16}$ olefins can be obtained by a liquid phase polymerization of $C_5$ through $C_9$ olefins by intimately contacting the olefinic feed in a reaction zone with 1 to 30, preferably 5 to 20, liquid volume percent of an acid catalyst containing 20 to 50 liquid volume percent of 85 to 100% sulfuric acid and 50 to 80 liquid volume percent of 100 to 150% phosphoric acid. This reaction is conducted at temperatures in the range of 32° F. to 212° F., preferably 100 to 150° F., and the time of reaction is between ⅛ and 5 hours depending on the starting material and the desired end product. The reaction may be carried out either at atmospheric or superatmospheric pressures, e.g. 0 to 2000 p.s.i.g., however, atmospheric pressure is preferred. The reaction may be carried out by dispersing the liquid catalyst in the olefinic feedstock, or the catalyst may be adsorbed on a suitable adsorbent such as activated carbon or molecular sieve material. The 100 to 150% phosphoric acid may be produced from either commercial grade phosphoric acid and phosphorus pentoxide, or by concentrating commercial phosphoric acid. The preferred combination of this catalyst is in the liquid volume percent range of 1:4 to 1:1, 97–98% sulfuric acid to 110% phosphoric acid. With this catalyst, a single run through batch conversion to $C_{12}$ and $C_{12}+$ polymer is approximately 50% to 60% and the light ends may be recycled. Phosphoric acid alone or a catalyst in which phosphoric acid is the sole active ingredient will not produce polymerization at normal temperatures and pressures. Sulfuric acid or a catalyst in which sulfuric acid is the sole active ingredient will produce polymerization yielding $C_{13}$ through $C_{16}$ olefins. However, the selectivity to $C_{13}$ through $C_{16}$ olefins is not as high as with the catalyst of this invention and the quality of the olefinic polymer produced is inferior being contaminated with paraffins, dienes, and even some aromatics. When a sulfuric acid catalyst is used by itself the product, upon neutralization with sodium carbonate, sometimes forms a stable emulsion causing further difficulty in processing the product. No such difficulty is encountered with the catalyst of this invention when employed as set forth herein.

It has further been found that the qualities of the catalysts of this invention can be further enhanced by incorporating therein small amounts of a cupric salt, e.g. 0.15 to 15% anhydrous cupric sulfate based on total catalyst, thus forming a catalyst comprising in combination a major proportion of the aforedescribed sulfuric acid-phosphoric acid combination and a minor proportion of a cupric salt.

*Example 1.*—A catalyst suitable for this type of polymerization was prepared by pouring 20 parts of 98% sulfuric acid into 80 parts of 110% phosphoric acid. The phosphoric acid was prepared by adding 132 grams of $P_2O_5$ in incremental amounts to 183 ml. of 86% phosphoric acid.

*Example 2.*—A catalyst was prepared as in Example 1 and to this was added 1 wt. percent of anhydrous cupric sulfate based on total catalyst.

*Example 3.*—A catalyst was prepared as in Example 1 except for the difference that 60 parts of the 110% phosphoric acid were mixed with 60 parts of 97% $H_2SO_4$.

*Example 4.*—Three liters of $C_7$ olefins produced from a co-polymerization feedstock of propylene and butylene by conventional UOP type polymerization using phosphoric acid on kieselguhr were fed into a centrifugal pump reactor and contacted with 10 liquid volume percent of the catalyst of Example 1. The reaction was carried out at atmospheric pressure at a temperature of about 130° F. for a period of 1½ hours. The catalyst was then separated and the product neutralized completely with a 2% sodium carbonate solution. The crude product was then dried and fractionated. The light ends were recycled. Several such runs were made and a typical single run conversion was about 50%. Conversions in excess of about 80% are achievable by recycling the light ends. Of the converted first pass material about 90% was found to be in the $C_{13}$ through $C_{16}$ range and the remaining 10% was made up of higher boiling polymers.

*Example 5.*—Polymer product prepared in Example 4 was examined by the fluorescent indicator method to determine if the catalyst had caused any deterioration of the olefin. The results of the fluorescent indicator analysis are given below:

$C_7$ starting material: 96% olefinic material;
$C_{13}$ to $C_{16}$ product: 100% olefinic material;
$C_{13}$ to $C_{16}$ (from recycled light ends): 100% olefin;
Light ends from recycle of original light ends: 87% olefin.

No trouble was encountered with emulsion formation when the product was neutralized with aqueous sodium carbonate indicating an almost complete lack of sulfonation of the olefin with this catalyst.

*Example 6.*—Liquid phase polymerization of $C_6$ to $C_9$ olefins was conducted with various catalysts and the results compared with the results of a polymerization using the catalyst of Example 3.

The olefinic feed employed for these tests consisted of equal parts of $C_6$ and $C_9$ olefins previously polymerized from propylene by the conventional UOP type of polymerization using phosphoric acid on kieselguhr. The tests represent single pass polymerizations at atmospheric pressure. The reaction products were analyzed and the results are shown in the following table:

TABLE I

*Comparative conversions to $C_{12}$ and $C_{12}+$ polymer*

| Catalyst (10 LV percent on Monomer) | Starting Material and Molar Ratio | Average Temp., °F. | Reaction Time (hr.) | Percent Conversion to $C_{12}$ and $C_{12}+$ | Percent Conversion to $C_{12}+$ |
|---|---|---|---|---|---|
| 1:1::86% $H_3PO_4$; 98% $H_2SO_4$ | 1:1::$C_6$:$C_9$ | 130 | 2 | 40 | 36 |
| 5:7::86% $H_3PO_4$; 98% $H_2SO_4$ | 1:1::$C_6$:$C_9$ | 130 | ¾ | 34 | 32.5 |
| 1:1::86% $H_3PO_4$; 98% $H_2SO_4$+10% $AlCl_3$ | 1:1::$C_6$:$C_9$ | 130 | 1½ | 40 | 35.6 |
| 1:1::110% $H_3PO_4$; 97% $H_2SO_4$ | 1:1::$C_6$:$C_9$ | 130 | 1½ | 55 | 50.6 |

*Example 7.*—Polymerizations of $C_7$ olefins such as that employed in Example 4 were carried out in a centrifugal pump reactor to determine the effect upon $C_{13}$ to $C_{15}$ selectivity between the catalyst of Example 1 and the catalyst of Example 2, i.e. the effect of the addition of small amounts of anhydrous cupric sulfate. The results obtained and the conditions employed are set forth in the following table:

TABLE II

| Catalyst (10 LV Percent) | Starting Material | Average Temp., °F. | Reaction Time (Hr.) | Percent Conversion to $C_{12}$ and $C_{12}+$ | Products, Percent Selectivity | | | |
|---|---|---|---|---|---|---|---|---|
| | | | | | Light Ends (Percent 1–390° F.) | Percent $C_{13}$–$C_{15}$ (390–460° F) | Percent $C_{15}$–$C_{16}$ (460–580° F.) | Percent $C_{16}+$ (480+° F.) |
| 8:2::110% phosphoric acid; 98% $H_2SO_4$ | $C_7$ | 130 | 1½ | 53 | 52.3 | 40.5 | 3.2 | 3.8 |
| 8:2::110% phosphoric acid; 98% $H_2SO_4$+1% anh. $CuSO_4$ | $C_7$ | 130 | 1½ | 55.0 | 50.0 | 42.6 | 2.2 | 5.0 |

All percentages recited herein unless otherwise designated shall be understood to refer to weight percent.

What is claimed is:

1. An improved process for producing $C_{13}$ to $C_{16}$ olefin polymer which comprises intimately contacting $C_6$ to $C_9$ olefins in a reaction zone with 5 to 20 liquid volume percent of an acid catalyst consisting essentially of equal volumes of 85 to 100 weight percent sulfuric acid and about 100 to 110 weight percent phosphoric acid at a temperature in the range of 100° to 160° F. for a period of time in the range of ⅛ to 5 hours.

2. An improved process for producing $C_{13}$ to $C_{16}$ olefin polymer which comprises intimately contacting $C_6$ to $C_9$ olefins in a reaction zone with 5 to 20 liquid volume percent of an acid catalyst consisting essentially of about equal volumes of about 98 weight percent sulfuric acid and about 110 weight percent phosphoric acid at a temperature in the range of 100° to 160° F. for a period of time in the range of ⅛ to 5 hours.

3. An improved process for producing $C_{13}$ to $C_{16}$ olefin polymer which comprises intimately contacting $C_6$ to $C_9$ olefins in a reaction zone with 1 to 30 liquid volume percent of an acid catalyst consisting essentially of 85 to 99.85 weight percent of a liquid containing 20 to 50 liquid volume percent of 85 to 100 weight percent sulfuric acid and 50 to 80 liquid volume percent of 100 to 110 weight percent phosphoric acid, and 0.15 to 15 weight percent of cupric sulfate, at a temperature in the range of 100° to 160° F., and a pressure in the range of 0 to 2000 p.s.i.g. for a period of time in the range of ⅛ to 5 hours.

4. An improved process for producing $C_{13}$ to $C_{16}$ olefin polymer which comprises intimately contacting $C_6$ to $C_9$ olefins in a reaction zone with 5 to 20 liquid volume percent of an acid catalyst consisting essentially of about 85 to 99.85 weight percent of a liquid containing about equal volumes of about 98 weight percent sulfuric acid and about 110 weight percent phosphoric acid, and about 0.15 to 15 weight percent of cupric sulfate, at a temperature in the range of 100° to 160° F. and a pressure in the range of 0 to 2000 p.s.i.g. for a period of time in the range of ⅛ to 5 hours.

5. A liquid polymerization catalyst consisting essentially of (a) 85 to 99.85 weight percent of a liquid containing (1) about 20 to 50 liquid volume percent of 85 to 100 weight percent sulfuric acid and (2) 50 to 80 liquid volume percent of 100 to 110 weight percent phosphoric acid and (b) 0.15 to 15 weight percent of cupric sulfate.

6. A liquid polymerization catalyst consisting essentially of 85 to 99.85 weight percent of a liquid containing about equal volumes of about 98 weight percent sulfuric acid and 110 weight percent phosphoric acid and 0.15 to 15 weight percent of cupric sulfate.

References Cited in the file of this patent

UNITED STATES PATENTS

| | | |
|---|---|---|
| 2,006,695 | Ipatieff | July 2, 1935 |
| 2,161,392 | Stevens et al. | June 6, 1939 |
| 2,778,804 | Corner et al. | Jan. 22, 1957 |
| 2,814,655 | Langlois et al. | Nov. 26, 1957 |
| 2,902,523 | Langlois et al. | Sept. 1, 1959 |

FOREIGN PATENTS

| | | |
|---|---|---|
| 450,668 | Great Britain | July 20, 1936 |